(12) United States Patent
Gould et al.

(10) Patent No.: US 11,754,393 B2
(45) Date of Patent: Sep. 12, 2023

(54) LASER LEVEL INTERFACE AND CONTROL

(71) Applicant: Milwaukee Electric Tool Corporation, Brookfield, WI (US)

(72) Inventors: Samuel A. Gould, West Allis, WI (US); Samuel J. Howard, Hales Corners, WI (US); Garrett E. Schoonover, Milwaukee, WI (US); Jacob D. Hadfield, Mukwonago, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/550,798

(22) Filed: Dec. 14, 2021

(65) Prior Publication Data

US 2022/0170743 A1    Jun. 2, 2022

Related U.S. Application Data

(63) Continuation of application No. PCT/US2021/061154, filed on Nov. 30, 2021.

(60) Provisional application No. 63/119,800, filed on Dec. 1, 2020.

(51) Int. Cl.
*G01C 15/00* (2006.01)

(52) U.S. Cl.
CPC ......... *G01C 15/004* (2013.01); *G01C 15/008* (2013.01)

(58) Field of Classification Search
None
See application file for complete search history.

(56) References Cited

U.S. PATENT DOCUMENTS

| 4,820,041 | A | 4/1989  | Davidson et al. |
| 5,457,890 | A | 10/1995 | Mooty           |
| 5,551,159 | A | 9/1996  | Mooty           |
| 5,742,387 | A | 4/1998  | Ammann          |
| 5,784,155 | A | 7/1998  | Ohtomo et al.   |
| 5,852,493 | A | 12/1998 | Monnin          |
| 5,894,123 | A | 4/1999  | Ohtomo et al.   |
| 5,907,907 | A | 6/1999  | Ohtomo et al.   |
| 5,946,087 | A | 8/1999  | Kasori et al.   |

(Continued)

FOREIGN PATENT DOCUMENTS

| CN | 205027319 | 2/2016 |
| CN | 210221092 | 3/2020 |

(Continued)

OTHER PUBLICATIONS

International Search Report and Written Opinion for International Application No. PCT/US2021/061154, dated Mar. 24, 2022, 10 pages.

*Primary Examiner* — Christopher W Fulton
(74) *Attorney, Agent, or Firm* — Reinhart Boerner Van Deuren s.c.

(57) ABSTRACT

Various laser level designs and remote controls are shown. In another example, the remote control for a laser level receives a plurality of interface protocols configured to control one or more laser levels, and subsequently selects one of the interface protocols when initiating control of a laser level. In another example, the relative positions a remote control with respect to a laser level are determined, and subsequently a visual representation is presented at the remote control based on the relative positions.

20 Claims, 13 Drawing Sheets

(56) References Cited

U.S. PATENT DOCUMENTS

| | | | |
|---|---|---|---|
| 6,011,613 A | 1/2000 | Ohtomo et al. | |
| 6,055,046 A | 4/2000 | Cain | |
| 6,075,586 A | 6/2000 | Ohtomo et al. | |
| 6,184,979 B1 | 2/2001 | Hirano et al. | |
| 6,249,338 B1 | 6/2001 | Ohtomo et al. | |
| 6,314,650 B1 | 11/2001 | Falb | |
| 6,452,668 B1 | 9/2002 | Pratt | |
| 6,519,029 B1 | 2/2003 | Hedges et al. | |
| 6,606,798 B2 | 8/2003 | McCracken et al. | |
| 6,618,133 B2 | 9/2003 | Hedges et al. | |
| 6,621,565 B2 | 9/2003 | Pratt et al. | |
| 6,630,993 B1 | 10/2003 | Hedges et al. | |
| 6,662,103 B2 | 12/2003 | Skolnick et al. | |
| 6,688,011 B2 | 2/2004 | Gamal et al. | |
| 6,915,583 B2 | 7/2005 | El-Katcha et al. | |
| 7,013,571 B2 | 3/2006 | El-Katcha et al. | |
| 7,115,852 B2 | 10/2006 | Ohtomo et al. | |
| 7,190,439 B2 | 3/2007 | Burkhart, Jr. | |
| 7,266,898 B2 | 9/2007 | El-Katcha et al. | |
| 7,296,360 B2 | 11/2007 | El-Katcha et al. | |
| 7,363,716 B1 | 4/2008 | Tonkinson et al. | |
| 7,433,028 B2 | 10/2008 | Kumagai et al. | |
| 7,448,138 B1 | 11/2008 | Vanneman | |
| 7,589,829 B2 | 9/2009 | Yamazaki et al. | |
| 7,724,352 B2 | 5/2010 | Essling | |
| 7,760,369 B2 | 7/2010 | Sehr | |
| 7,814,670 B2 | 10/2010 | Katayama et al. | |
| 7,815,081 B2 | 10/2010 | Gist et al. | |
| 8,098,367 B2 | 1/2012 | Kirk et al. | |
| 8,132,334 B2 | 3/2012 | Winistoerfer | |
| 8,238,008 B2 | 8/2012 | Talbot et al. | |
| 8,269,612 B2 | 9/2012 | Horky et al. | |
| 8,272,616 B2 | 9/2012 | Sato et al. | |
| 8,407,903 B2 | 4/2013 | Koleszar et al. | |
| 8,508,825 B2 | 8/2013 | Talbot et al. | |
| 8,711,369 B2* | 4/2014 | Campagna | G01C 15/004 33/291 |
| 8,863,396 B2 | 10/2014 | Lukic et al. | |
| 8,869,411 B2 | 10/2014 | Lukic et al. | |
| 8,913,231 B2 | 12/2014 | Williams et al. | |
| 9,175,956 B2 | 11/2015 | Fessler et al. | |
| 9,188,441 B2 | 11/2015 | Munroe et al. | |
| 9,200,900 B2 | 12/2015 | Fessler et al. | |
| 9,222,772 B2 | 12/2015 | Munroe et al. | |
| 9,222,773 B2 | 12/2015 | Winistoerfer et al. | |
| 9,273,958 B2 | 3/2016 | Gros et al. | |
| 9,360,317 B2 | 6/2016 | Munroe et al. | |
| 9,389,073 B2 | 7/2016 | Dumoulin | |
| 9,407,364 B2 | 8/2016 | Dumoulin et al. | |
| 9,846,029 B2 | 12/2017 | Dumoulin et al. | |
| 9,866,322 B2 | 1/2018 | Dumoulin et al. | |
| 9,921,061 B2 | 3/2018 | Weber | |
| 10,066,935 B2 | 9/2018 | Schumacher et al. | |
| 10,309,780 B1 | 6/2019 | Hughes | |
| 10,545,021 B2 | 1/2020 | Horky et al. | |
| 10,670,398 B2 | 6/2020 | Essling | |
| 10,684,129 B2 | 6/2020 | Lukic et al. | |
| 10,697,796 B2 | 6/2020 | Lukic et al. | |
| 10,739,124 B2 | 8/2020 | Yuen et al. | |
| 10,823,565 B2 | 11/2020 | Winter et al. | |
| 10,866,320 B2* | 12/2020 | Nagalla | G01S 17/86 |
| 10,895,472 B2 | 1/2021 | Lukic | |
| 11,035,671 B2 | 6/2021 | Horky et al. | |
| 11,105,626 B2 | 8/2021 | Essling | |
| 11,119,202 B2 | 9/2021 | Shi et al. | |
| 11,435,182 B2* | 9/2022 | Hajmousa | G01C 15/006 |
| 2007/0044331 A1 | 3/2007 | Tang et al. | |
| 2007/0101593 A1 | 5/2007 | Jang | |
| 2013/0162971 A1 | 6/2013 | Winter et al. | |
| 2014/0283399 A1 | 9/2014 | Fessler et al. | |
| 2014/0338206 A1* | 11/2014 | Kahle | G01C 5/02 33/291 |
| 2018/0202805 A1 | 7/2018 | Unger et al. | |
| 2018/0335316 A1 | 11/2018 | Lukic | |
| 2018/0340771 A1 | 11/2018 | Schumacher et al. | |
| 2018/0347980 A1* | 12/2018 | Kotzur | G01C 15/008 |
| 2020/0240783 A1 | 7/2020 | Eidinger et al. | |
| 2020/0249016 A1 | 8/2020 | Shi et al. | |
| 2020/0300623 A1 | 9/2020 | Earley et al. | |
| 2021/0190948 A1 | 6/2021 | Zhang et al. | |
| 2022/0003546 A1* | 1/2022 | Honoki | G01C 9/06 |
| 2022/0326011 A1* | 10/2022 | Wong | G01R 19/16571 |

FOREIGN PATENT DOCUMENTS

| | | |
|---|---|---|
| DE | 4406914 | 9/1995 |
| DE | 29914297 | 1/2000 |
| DE | 19716710 | 7/2010 |
| DE | 202013009045 | 1/2014 |
| EP | 1203930 | 2/2007 |
| KR | 10-2016-0066566 | 6/2016 |
| WO | WO12049410 | 4/2012 |
| WO | WO12049411 | 4/2012 |
| WO | WO15062139 | 5/2015 |
| WO | WO16105550 | 6/2016 |
| WO | WO17066836 | 4/2017 |
| WO | WO18171276 | 9/2018 |
| WO | WO20141069 | 7/2020 |

* cited by examiner

LASER LEVEL INTERFACE AND CONTROL

CROSS-REFERENCE TO RELATED PATENT APPLICATION

The present application is a continuation of International Application No. PCT/US2021/061154, filed on Nov. 30, 2021, which claims the benefit of and priority to U.S. Provisional Application No. 63/119,800, filed on Dec. 1, 2020, which is incorporated herein by reference in its entirety.

BACKGROUND OF THE INVENTION

The present invention relates generally to the field of tools. The present invention relates specifically to a stand for a laser projection device, such as rotary laser level, a cross-line laser level, a point laser level, etc., that projects one or more lasers onto a work piece or work surface.

SUMMARY OF THE INVENTION

One embodiment of the invention relates to a method of controlling a laser level. The method includes receiving a plurality of interface protocols at a remote control, each of the plurality of interface protocols configured to enable the remote control to interact with one or more of a plurality of laser levels. Each of the plurality of laser levels includes a laser light generator operable to emit a beam of light at a predetermined orientation with respect to gravity. The method further includes selecting a first interface protocol of the plurality of interface protocols. The method further includes the remote control utilizing the first interface protocol to wirelessly control a first laser level of the plurality of laser levels. The method further includes the remote control utilizing the first interface protocol to wirelessly control a second laser level of the plurality of laser levels. The method further includes installing an update for a software on the second laser level. The method further includes, subsequent to installing the update for the software on the second laser level, the remote control continuing to utilize the first interface protocol to control the second laser level.

Another embodiment of the invention relates to a method of controlling a laser beam generating device. The method includes determining a relative position of a remote control with respect to a laser level. The laser level includes a housing and a laser light generator disposed within the housing, and the laser light generator is operable to emit a beam of light at a predetermined orientation with respect to gravity. The method further includes generating a visual interface at a remote control, the visual interface based at least in part on the relative position of the remote control with respect to the laser level. The visual interface includes a visual representation of the beam of light emitted by the laser level, and a plurality of operable instructions selectable to adjust an orientation of the beam of light with respect to the housing. The method further includes emitting a signal, by the remote control, indicating that a first instruction of the plurality of operable instructions was selected. The method further includes, as a result of receiving the signal, controlling the laser level to adjust the orientation of the beam of light with respect to the housing.

Another embodiment of the invention relates to a method of controlling a laser beam generating device. The method includes generating a visual interface at a remote control to control a laser level, the laser level including a housing and a laser light generator disposed within the housing, and the laser light generator is operable to emit a beam of light. The visual interface includes a visual representation of the beam of light emitted by the laser level, and a plurality of operable instructions selectable to adjust an orientation of the beam of light with respect to the housing. The method further includes emitting, by the remote control, a signal indicating that a first instruction of the plurality of operable instructions was selected. The method further includes determining a relative position of the remote control and the laser level with respect to each other. The method further includes, as a result of receiving the signal, the laser level adjusting the orientation of the beam of light with respect to the housing at least in part based on the determined relative position.

Another embodiment of the disclosure relates to method of controlling a first laser beam generating device. The method includes receiving a plurality of interface protocols at a remote control, the plurality of interface protocols each configured to enable the remote control to interact with a laser beam generating device. The first laser beam generating device includes a laser light generator operable to emit a beam of light. The method includes selecting a first interface protocol from the plurality of interface protocols, utilizing the first interface protocol for the remote control to control the first laser beam generating device, and installing an update for software on the first laser beam generating device. Subsequent to installing the update for the software on the first laser beam generating device, the remote control selects a second interface protocol from the plurality of interface protocols and uses the second interface protocol to control the first laser beam generating device.

In a specific embodiment, the method includes generating a graphical user interface at the remote control based at least in part on the first interface protocol. The graphical user interface includes one or more operable commands selectable to operate the laser beam generating device, and one or more non-operable commands configured to operate a second laser beam generating device but not configured to operate the first laser beam generating device. In a specific embodiment, the one or more non-operable commands are not selectable while the remote control is controlling the first laser beam generating device. In a specific embodiment, the remote control includes a housing and a light-receiving sensor, such as a photodiode array, positioned on a lateral face of the housing.

Another embodiment of the disclosure relates to a laser beam generating device including a housing, a laser light generator disposed within the housing operable to generate a beam of light, and a plurality of modes of operation. The plurality of modes of operation include a normal operating mode and a stand-by mode. The stand-by mode is configured to use less power than the operating mode. When the laser beam generating device is operating in the stand-by mode, the laser beam generating device generates an alert in response to the laser beam generating device detecting that it is being moved (e.g., via internal vials, an IMU sensor, etc.). In a specific embodiment, the alert includes one or more of emitting light by the laser light generator, emitting a sound, and emitting light from a light-emitting device of the laser beam generating device other than the laser light generator (e.g., an LED coupled to the housing).

Another embodiment of the disclosure relates to a laser beam generating device including a housing, a laser light generator disposed within the housing operable to emit a beam of light over an arc around the housing, and a plurality of buttons coupled to the housing. Each button of the plurality of buttons toggles whether the arc of light is emitted in a respective sub-arc of the arc of light.

In a specific embodiment, the respective sub-arcs are between 80-100 degrees around the housing with respect to a central axis. In a specific embodiment, the respective sub-arcs for the plurality of buttons are distinct from the other sub-arcs.

Another embodiment of the disclosure relates to a method of controlling a laser beam generating device. The method includes generating a graphical user interface at the remote control to control a laser beam generating device. The laser beam generating device includes a housing and a laser light generator disposed within the housing. The laser light generator is operable to emit a beam of light. The graphical user interface includes a visual representation of the beam of light emitted by the laser beam generating device, and a plurality of operable commands selectable to adjust an orientation of the beam of light with respect to the housing. The method includes emitting a signal indicating that a first command of the plurality of operable commands was selected. As a result of receiving the signal, the laser beam generating device adjusts the orientation of the beam of light.

In a specific embodiment, the method includes determining relative positions of the remote control and the laser beam generating device with respect to each other, and the orientation of the beam of light is adjusted at least in part based on the determined relative positions. In a specific embodiment, the remote control includes a light-receiving diode, and the relative positions are determined at least in part based on the light-receiving diode receiving the beam of light emitted by the laser beam generating device.

Another embodiment of the disclosure relates to a laser beam generating device including a housing, a laser light generator disposed within the housing operable to generate a beam of light, and a plurality of light-emitting devices that indicate a non-zero slope of the beam of light with respect to a horizontal direction. Each of the plurality of light-emitting devices corresponds to a respective distinct non-zero slope of the beam of light.

Another embodiment of the disclosure relates to a method of operating a laser beam generating device. The method includes adjusting an orientation of a beam of light emitted by a laser beam generating device. The laser beam generating device includes a housing, a laser light generator and a leveling component disposed within the housing. The laser light generator is configured to emit the beam of light and the leveling component is configured to adjust an orientation of the beam of light. The method includes determining whether the leveling component can adjust the orientation of the beam of light to a predetermined orientation. As a result of determining the leveling component can adjust the orientation of the beam of light to a target orientation, the method includes emitting the beam of light by the laser light generator. Subsequent to emitting the beam of light by the laser light generator, the leveling component continues to adjust the orientation of the beam of light. In a specific embodiment, the target orientation is a range of orientations.

Another embodiment of the disclosure relates to a laser beam generating device including a housing, a laser light generator disposed within the housing configured to emit a beam of light, and a plurality of support legs coupled to the housing. A first leg of the plurality of support legs includes an adjustment mechanism configured to adjust a total length of the first leg and thereby adjust an orientation of the housing, and a plurality of gradations selectable by the adjustment mechanisms. Each of the plurality of gradations corresponds to a distinct resultant orientation of the housing selectable by the adjustment mechanism.

Additional features and advantages will be set forth in the detailed description, which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION

Figure 1:
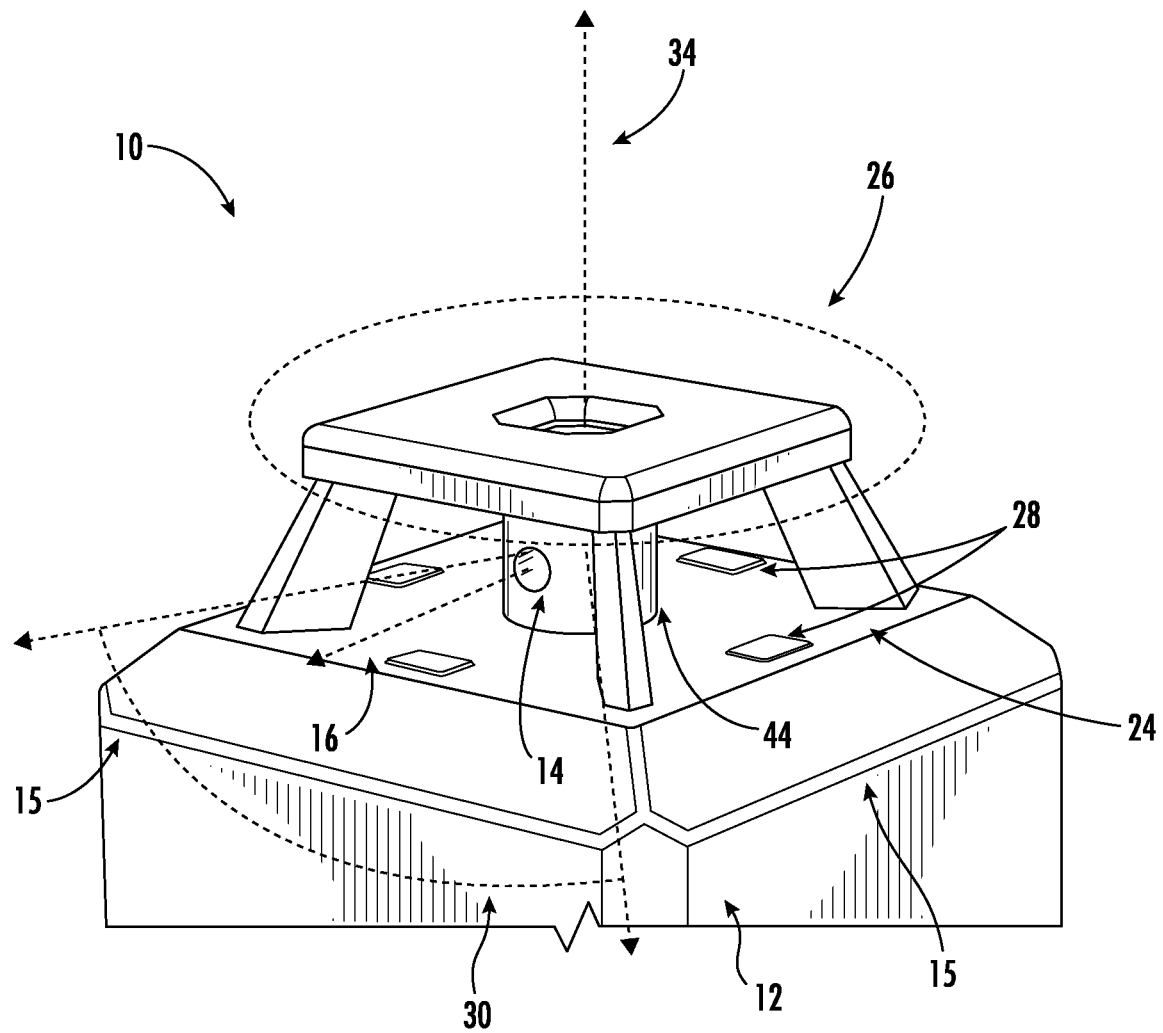
FIG. 1 is a perspective view of a laser level, according to an embodiment.
Figure 2:
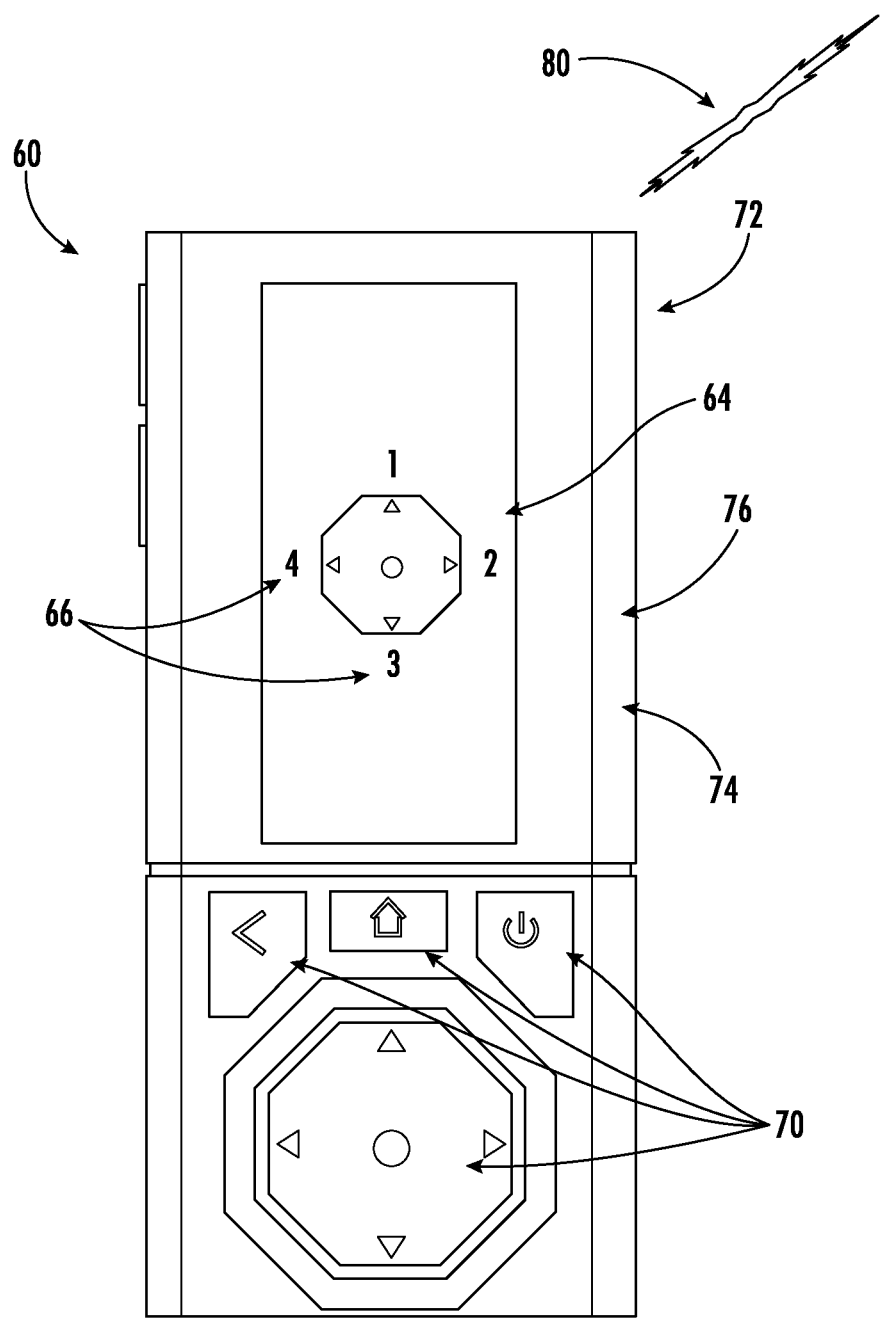
FIG. 2 is a perspective view of a remote control, according to an embodiment.

Referring generally to the figures, various embodiments of laser projection devices, such as a rotary laser level, are shown. As discussed herein, Applicant has developed a number of improvements to the functionality and/or control of laser levels, and specifically to rotary laser levels. In one embodiment, a remote control for a laser level is preloaded with a plurality of interface protocols for interacting with a laser level. When software on the laser level is updated, the remote control can continue controlling the laser level by selecting an updated interface protocol that is already loaded on the remote control.

In another embodiment, the remote control and laser level provide an improved mechanism for adjusting an orientation of the laser emitted by the laser level. The remote control includes a graphical user interface that depicts a representation of the laser emitted by the laser level. The user can select a command from the graphical user interface to adjust the orientation of the emitted laser (e.g., giving the laser a 1% slope in a specified direction), thereby making the interface more intuitive for users. Applicant has observed that it can be difficult for users to visualize how the laser level should be adjusted. By providing a graphical user interface, the laser level and remote control perform much of that visualization for the users, thereby simplifying the process.

In another embodiment, the laser level includes one or more interface elements, such as physical buttons, that permit a user to toggle whether light is emitted from the laser level over a corresponding arc around the laser level. For example, the laser level may include four such buttons, with each button toggling whether light is emitted to a corresponding quadrant around the laser level. In such embodiments, the buttons are physically positioned adjacent to the direction of laser projection, such that the physical position of the button indicates the direction from which the laser light will be projected via operation of the associated button.

In another embodiment, the self-leveling laser begins emitting a laser once it is determined that a target orientation is achievable but before the laser is leveled. Applicant has observed that people using self-leveling laser levels wait longer than needed by the laser before proceeding to the work space location where they will begin working. For example, some self-leveling laser levels do not emit a laser until the self-leveling is complete. However, the laser level can often determine relatively quickly whether the self-leveling process will be able to adjust the laser level to the target orientation. The self-leveling laser begins emitting a laser once it is determined that the target orientation is achievable and continues emitting the laser through the rest of the self-leveling process. Thus, the user receives a relatively quick indication that the self-leveling process will be completed successfully, and can walk from the laser level while the self-leveling process is completing.

Referring to FIGS. 1-4, various aspects of a laser beam generating device, shown as a laser level 10, are shown. Laser level 10 includes a light generating device, shown as laser light generator 14, disposed within housing 12. Laser light generator 14 is operable to emit a beam of light, shown as laser 16, over arc 26 around housing 12. Arc 26 is centered around axis 34.

In a specific embodiment, laser level 10 is a rotary laser level. Laser light generator 14 is centered on axis 34 and spins sufficiently quickly so that laser 16 emitted from laser level 10 gives the effect of a line of light, such as arc 26, being emitted from laser level 10 around housing 12.

Laser level 10 is utilized to emit laser 16 on surrounding work surfaces (e.g., walls, doors, etc.) that indicate a uniform orientation with respect to laser level 10. For example, laser level 10 may be positioned at a certain height above the ground, such as three feet above the ground, and emit laser 16 in a periphery around laser at a constant height of three feet.

In a specific embodiment, laser level 10 includes a plurality of modes of operation, including a normal operating mode and a stand-by mode. When the laser level 10 is operating in the stand-by mode, the laser level 10 uses less power than when the laser level 10 is operating in the normal operating mode. When the laser level 10 is operating in the stand-by mode, the laser level 10 generates an alert in response to the laser level 10 detecting it is being moved. In various embodiments, laser level 10 includes one or more movement sensors, such as one or more accelerometer, that generate a signal to movement of laser level 10, and in this embodiment, the alert is generated in response to the signal from the one or more movement sensors. In a specific embodiment, the alert is one or more of emitting light by the laser light generator, emitting a sound (e.g., a buzzing sound, a chirp sound) via a sound generating device 24, emitting light from a light-emitting device other than the laser light generator, such as an LED coupled to an exterior of housing 12.

Applicant has observed that users may want to temporarily stop using a laser level (e.g., during a lunch break) but still have the laser level maintain the settings the user has been working with. Therefore, to save battery in the laser level the user may turn the laser level into stand-by mode. However, it can be difficult to tell the difference between a laser level in stand-by mode and a laser level that is off. One risk that results from this is that the user may mistakenly believe a laser level is off rather than in stand-by, and therefore place the laser-level in storage (e.g., back in a box for transportation and storage). Once stored, the laser level will continue using battery power until the power is depleted. Accordingly, in various embodiments the laser level 10 will emit a sound when in stand-by mode in response to detecting that the laser level 10 is being moved.

Laser level 10 includes a plurality of buttons, shown as physical buttons 28, which are coupled to housing 12. In a specific embodiment, each physical button 28 of the plurality of physical buttons 28 corresponds to a respective sub-arc 30 of arc 26 of laser 16 around housing 12. When toggled, physical button 28 actuates whether laser 16 is emitted over the corresponding sub-arc 30. For example, physical button 28 on the bottom left-hand side of laser level 10 in FIG. 1 toggles whether laser level 10 emits laser 16 over sub-arc 30. One or more of the remaining physical buttons 28 similarly toggles whether laser level 10 emits laser 16 over the respective sub-arc of arc 26. In this manner, the physical positioning of buttons 28 on housing 12 provides an indication of the direction of laser emission controlled by the button. In a specific embodiment, laser level 10 includes four buttons 28, one located along each outer edge 15 of housing 12, such that each button 28 is between outer edge 15 and laser light generator 14.

In another embodiment, sub-arcs 30 over which laser 16 is emitted by other interfaces, such as a slider, a latch-style button, etc. In another embodiment, the laser level could include one or more blinders that can be used to manually block the laser 16 being emitted over various sub-arcs 30 (e.g., such as via motorized flaps that may be remotely deployed and controlled by the remote control).

In a specific embodiment, arc 26 includes a plurality of sub-arcs 30, and sub-arcs 30 extend between 80-100 degrees around housing 12 with respect to axis 34. In another specific embodiment, arc 26 includes a plurality of sub-arcs 30, each of which are distinct from the other sub-arcs 30.

Remote control 60 is configured to interact with laser level 10 from a distance. For example, a user selects an operable commands 66 on remote control 60, and in response remote control 60 emits signal 80 to laser level 10 that provides operable commands 66 to laser level 10.

Remote control 60 includes housing 72 and lateral face 74 of housing 72. In a specific embodiment, a signal detecting device, shown as light-receiving diode 76, is positioned along lateral face 74 of housing 72. Remote control 60 includes one or more physical interfacing components, shown as physical buttons 70, which receive input from a user that indicates the selection of one or more commands. In a specific embodiment, functionality of physical buttons 70 is abstracted to navigational buttons (e.g., directional, select, home, previous page, home, and volume), leaving model-specific controls to be displayed within the graphical user interface 64. In a specific embodiment, the functionality of one or more of physical buttons 70 can be remapped to different function, such as a function depicted on the graphical user interface 64.

Figure 3:
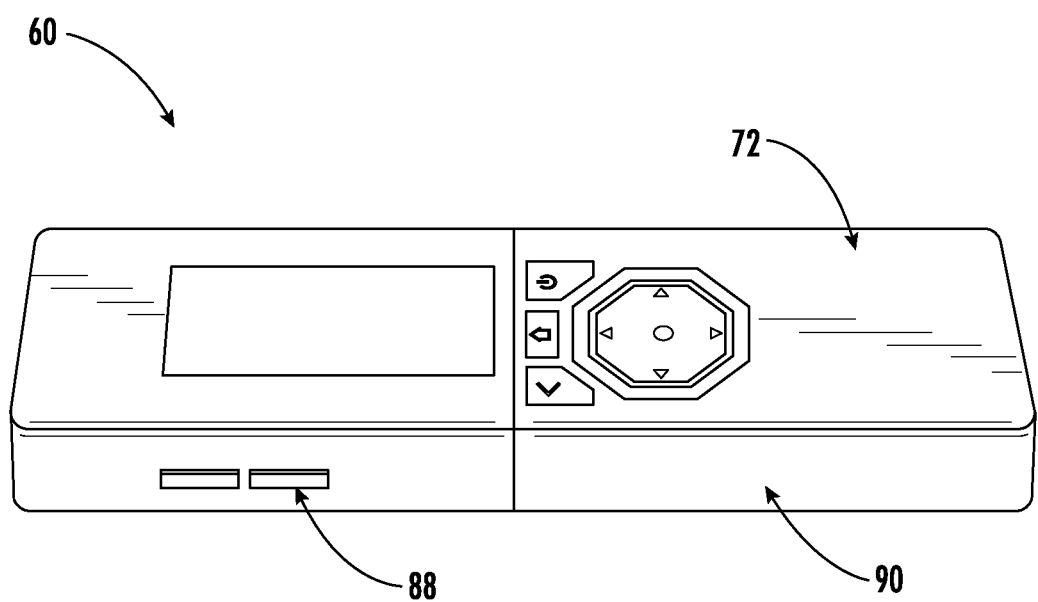
FIG. 3 is a perspective view of the remote control of FIG. 2, according to an embodiment.

In a specific embodiment, remote control 60 includes a volume control button 88 on opposing lateral face 90 of housing 72 (FIG. 3).

Figure 4:
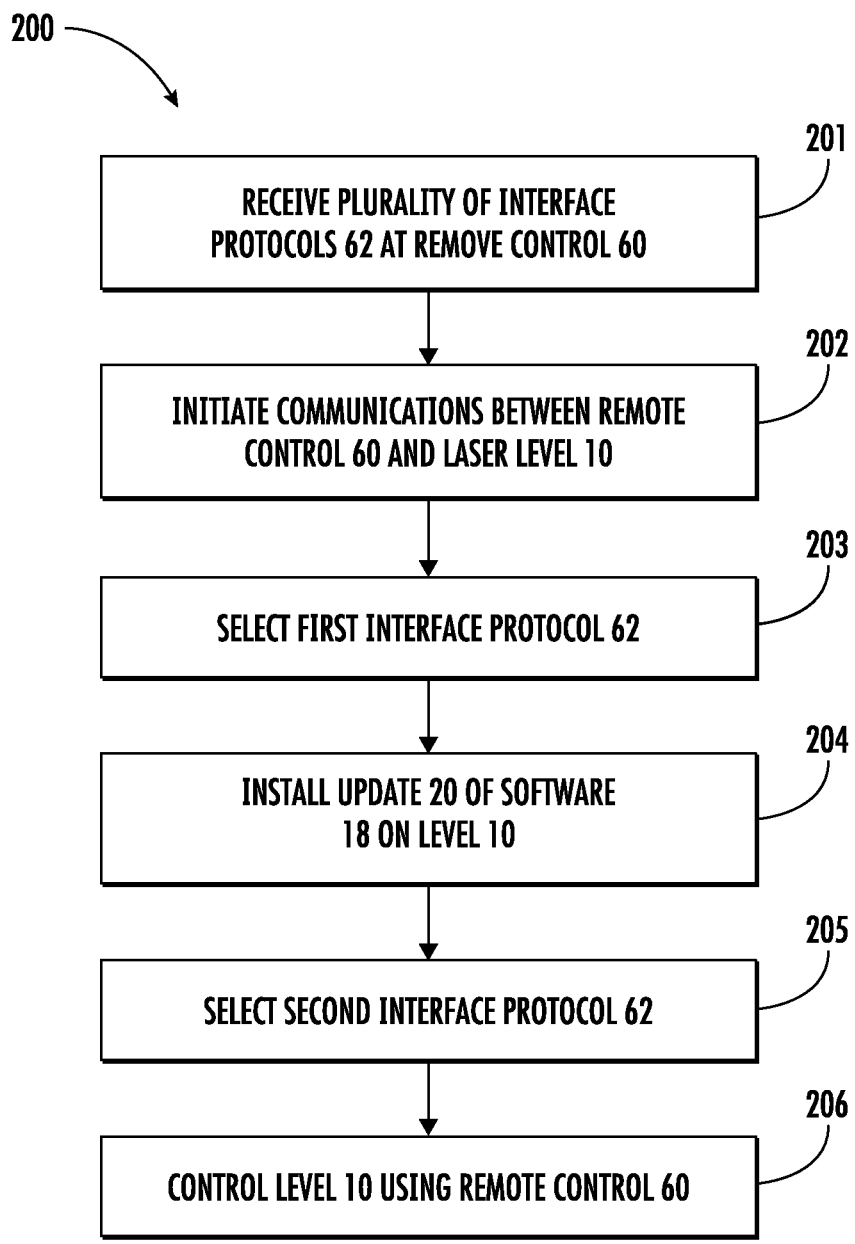
FIG. 4 is a method of using a laser level and a remote control, according to an exemplary embodiment.

Turning to FIG. 4, various aspects of an exemplary method 200 of using a laser level are shown. Initially, a plurality of interface protocols 62 are received at remote control 60 (step 201), the plurality of interface protocols 62 each configured to enable the remote control 60 to interact with laser level 10. Each of the plurality of interface protocols 62 are configured to enable the remote control 60 to interact with one or more of a plurality of laser levels, and each of the plurality of laser levels include a laser light generator operable to emit a beam of light at a predetermined orientation with respect to gravity.

Subsequently, remote control 60 selects a first interface protocol of the plurality of interface protocols, and remote control 60 initiates communication with a first laser level 10 (step 202). In a specific embodiment, remote control 60 selects a first interface protocol 62 of the plurality of interface protocols 62 (step 203) based at least in part on the initial communications. For example, the initial communications from the laser level 10 may indicate a level and/or version of the software/firmware operating on laser level 10. When remote control 60 receives that indication, remote control 60 selects the interface protocol 62 that corresponds to the software/firmware operating on laser level 10. Once first interface protocol 62 is selected, remote control 60 utilizes the first interface protocol 62 to control the laser level 10, such as via wirelessly control.

Optionally, remote control 60 utilizes first interface protocol 62 to control a second laser level of the plurality of laser levels, such as to wirelessly control. In various exemplary uses, the first laser level 10 is a first model of laser levels and the second laser level is the first model of laser levels (e.g., both laser levels are the same model). In various exemplary uses, the first laser level is a first model of laser levels and the second laser level is a second model of laser levels different than the first model.

Subsequently, update 20 for software 18 on laser level 10 is installed on the laser level 10, such as either the first laser level and/or the second laser level (step 204). In various embodiments software 18 being updated includes firmware on laser level 10 that is updated, and the step of installing the update replaces the firmware from a first version to a second version different than the first version. In various embodiments, the first laser level is configured with a first version of the firmware, and the remote control is configured to control both the first laser level configured with the first version of the firmware and to control a second laser level configured with the second version of the firmware different than the first version of the firmware.

Subsequent to the update, remote control 60 is still operable to remotely control the updated laser level 10, such as via the remote control 60 continuing to use the first interface protocol to control the laser level. In a specific embodiment, remote control 60 receives an indication from laser level 10 that software 18 has been updated. As a result remote control 60 selects second interface protocol 62 distinct from first interface protocol 62 (step 205), the second interface protocol 62 being configured to interact with the updated version of software 18 on laser level 10, whereas first interface protocol 62 was configured to interact with the previous version of software 18 on laser level 10.

Subsequent to second interface protocol 62 being selected, remote control 60 continues to control the laser level 10 (step 206). In one example, remote control 60 continues to use the same interface protocol to control the updated laser level 10. In another example, the remote control 60 uses a different interface protocol to control the updated laser level 10.

In various embodiments, a laser level and/or a remote control are configured to perform one or more of the steps/processes described herein. For example, in various embodiments a remote control is configured to receive a plurality of interface protocols at a remote control, each of the plurality of interface protocols configured to enable the remote control to interact with one or more of a plurality of laser levels. The remote control is further configured to receive the selection of a first interface protocol of the plurality of interface protocols, to utilize the first interface protocol to wirelessly control a first laser level of the plurality of laser levels, and to utilize the first interface protocol to wirelessly control a second laser level of the plurality of laser levels. The remote control is further configured to continue controlling a laser level even after being updated.

Figure 5:
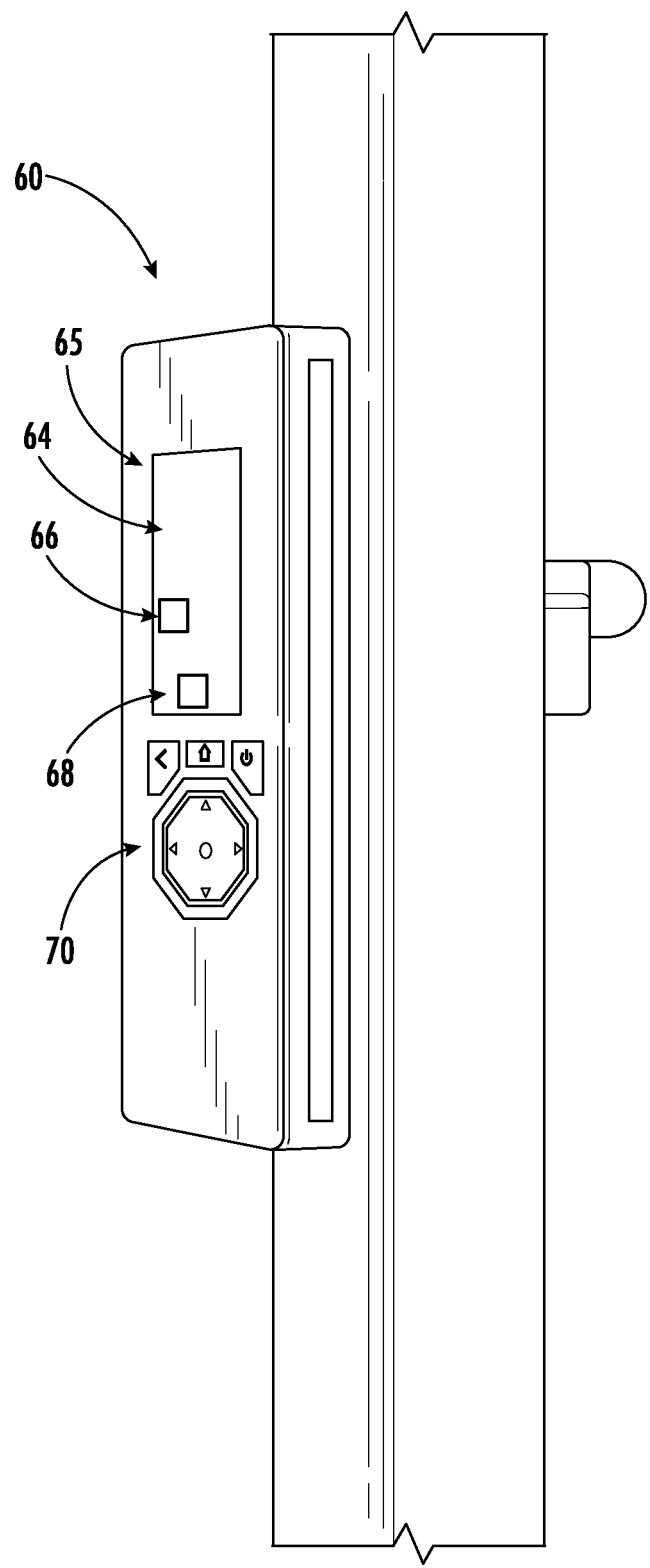
FIG. 5 is a perspective view of the remote control of FIG. 2, attached to a work piece, according to an exemplary embodiment.

Turning to FIG. 5, remote control 60 generates a graphical user interface 64 based at least in part on the selected interface protocol 62. Remote control 60 includes a display and interface mechanism 65, such as an LCD display screen with a touch-screen interface, that displays the graphical user interface 64. In a specific embodiment, graphical user interface 64 includes one or more operable commands 66 and one or more non-operable commands 68. Operable commands 66 are distinguished from non-operable commands 68 in that operable commands 66 are selectable to operate (e.g., control) laser level 10 that remote control 60 is controlling. Non-operable commands 68 are not selectable (e.g., they are greyed out) to operate laser level 10, for example because laser level 10 does not enable the corresponding functionality, whereas non-operable commands 68 are configured to operate a laser level other than laser level 10. In various embodiments, when the remote control is controlling a laser level for which the one or more non-operable instructions are not configured to control the laser level (e.g., because the laser level does not have that functionality), the one or more non-operable instructions are not selectable while the remote control is controlling that laser level.

For example, it may be advantageous to provide a consistent graphical user interface 64 that is independent of the specific functionality enabled by laser level 10. One advantage of including non-operable commands 68 in graphical user interface 64 is that the layout and design of the graphical user interface 64 will be consistent for the user so the user can find the desired commands more quickly and easily. Another advantage of including non-operable commands 68 in graphical user interface 64 is that the user may be reminded of other functionality that may be available to the user if the user pairs a different laser level with remote control 60.

Figure 6:
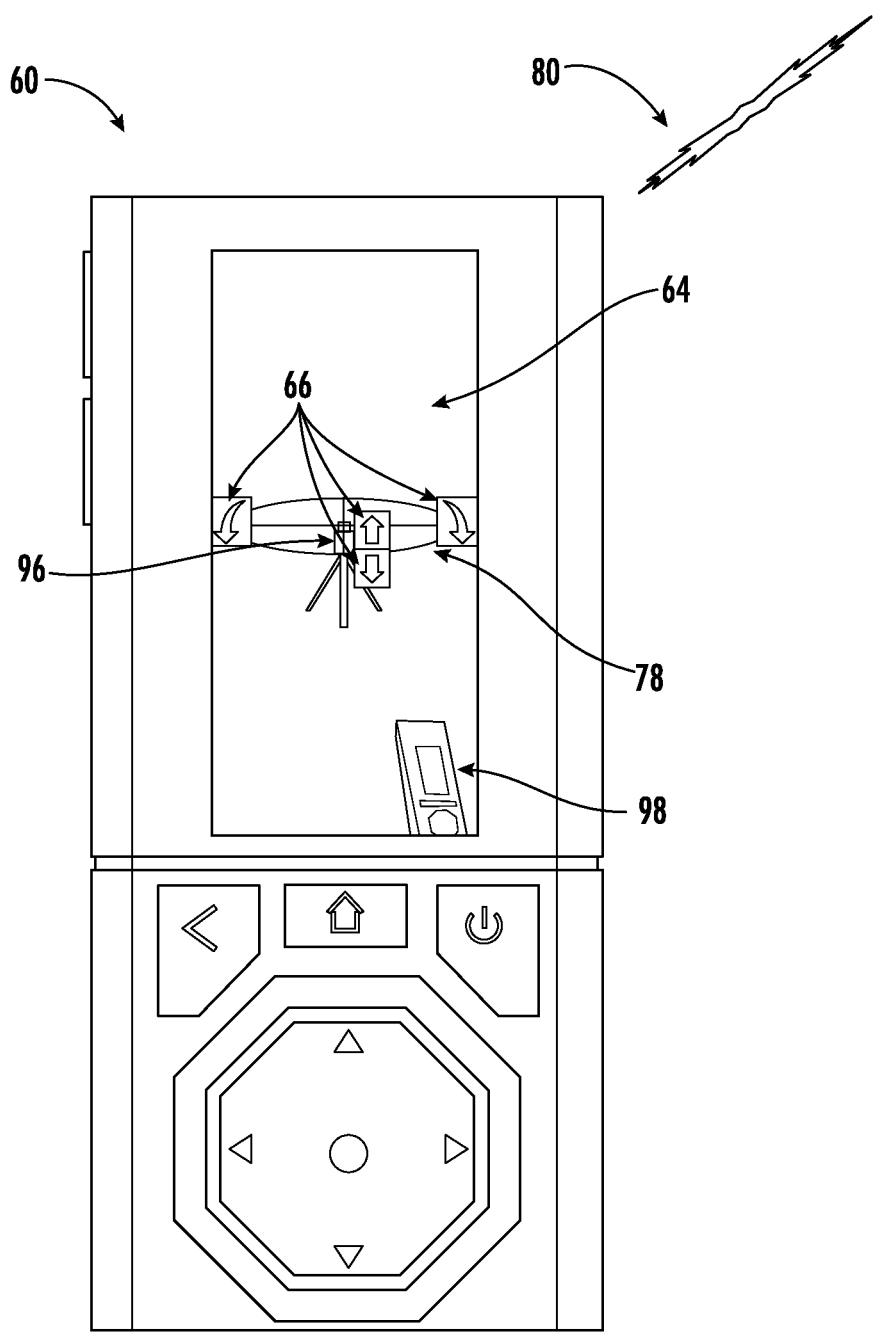
FIG. 6 is a perspective view of the remote control of FIG. 2, according to an exemplary embodiment.
Figure 7:
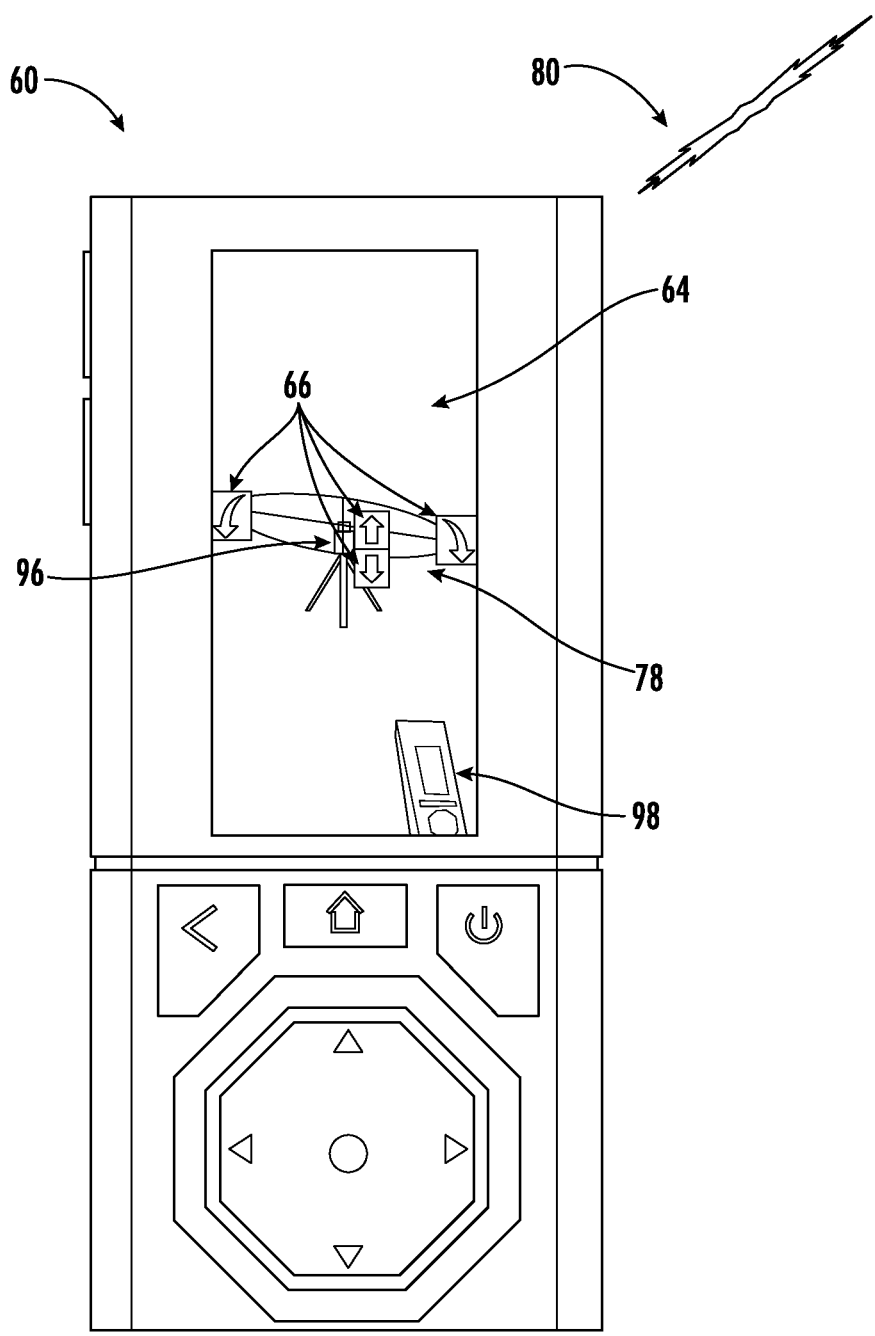
FIG. 7 is a perspective view of the remote control of FIG. 2, according to an exemplary embodiment.

Turning to FIGS. 6-7, various aspects of using remote control 60 to control laser level 10 are shown. Graphical user interface 64 includes a visual representation of light, shown as laser 78, emitted by a laser level, such as laser level 10. Graphical user interface 64 includes one or more operable commands 66 selectable to adjust an orientation of laser 78 emitted by laser level 10 with respect to the housing of laser level 10. As a result of operable commands 66 being selected, remote control 60 emits signal 80 indicating that a first command 66 of the plurality of operable commands 66 was selected. As a result of receiving the signal, laser level 10 adjusts the orientation of the beam of laser 16 with respect to the housing 12. In various embodiments, a relative position of the remote control and the laser level is determined by the laser level and/or the remote control in response to the laser level receiving the signal. In various embodiments, controlling the laser level to adjust the orientation of the beam of light includes tilting the laser 78 to a non-zero angle with respect to horizontal.

For example, if a user selects operable command 66 in FIG. 6 with the arrow pointing down on the right-side of graphical user interface 64, laser level 10 adjusts light emitted from laser level such that laser 16 emitted to the right of laser level 10 from the perspective of the user is emitted at a lower trajectory (e.g., the orientation of arc 26 of laser 16 is adjusted). Similarly, if a user selects the operable command 66 in FIG. 6 with the arrow pointing straight-up, laser 16 emitted from laser level 10 towards the user is adjusted to be emitted at an elevated trajectory, and light emitted from laser level 10 away from the user is adjusted to be emitted at a lower trajectory. In a specific embodiment, each selection of operable commands 66 adjusts orientation of arc 26 of laser 16 one degree with respect to axis 34.

In various embodiments, graphical user interface 64 includes a first image 96 representative of the laser level and/or a second image 98 representative of the remote control.

Referring to FIG. 7, after the orientation of laser 78 emitted from the laser level has been adjusted, the graphical user interface 64 is updated to project an image that indicates that laser 78 is tilted. In the example shown in FIG. 7, laser 78 has been adjusted so the right side is lower, and graphical user interface 64 has been similarly adjusted. In various embodiments, the graphical user interface 64 displays an exaggerated representation of the adjustment to laser 78 to make it easier for the user to see in the graphical user interface 64 that the laser has been adjusted.

Figure 8:
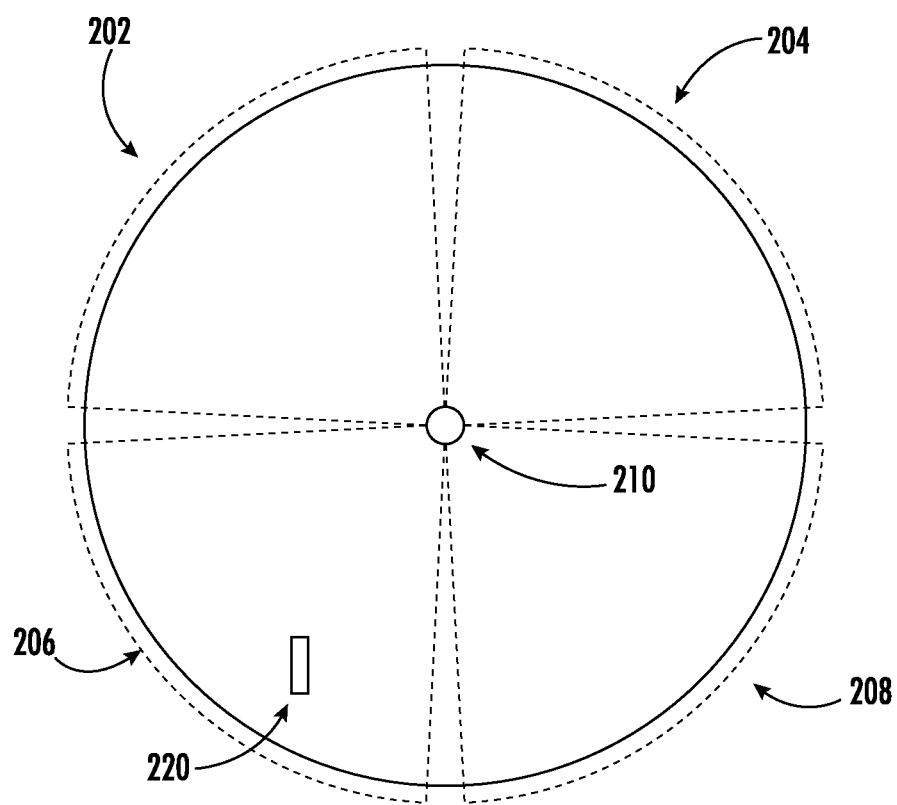
FIG. 8 is a top schematic view of a remote control and a laser level, according to an exemplary embodiment.

Referring to FIG. 8, in various embodiments the laser level 210 and/or the remote control 220 determine their relative positions via using quadrants. For example, four quadrants extend around laser level 210, quadrants 202, 204, 206, and 208. In use, the laser level 210 and/or the remote control 220 analyze signals and/or to determine in which quadrant the remote control 220 is located relate to laser level 210. In various embodiments, the quadrants extend 90 degrees circumferentially around the laser level 210.

In various embodiments, the step of controlling the laser level to adjust the orientation of the beam of light includes tilting the beam of light to a percent gradation with respect to horizontal. In various embodiments, the step of controlling the laser level to adjust the orientation of the beam of light includes tilting the beam of light to an angle with respect to horizontal.

In various embodiments, the laser level and/or the remote are configured to determine a relative position of a remote control with respect to a laser level. The remote control is configured to generate a visual interface at a remote control based at least in part on the relative position of the remote control with respect to the laser level. The remote control is further configured to emit a signal indicating that a first instruction of the plurality of operable instructions was selected. The laser level is further configured to, as a result of receiving the signal, control the laser level to adjust the orientation of the beam of light with respect to the housing.

Figure 9:
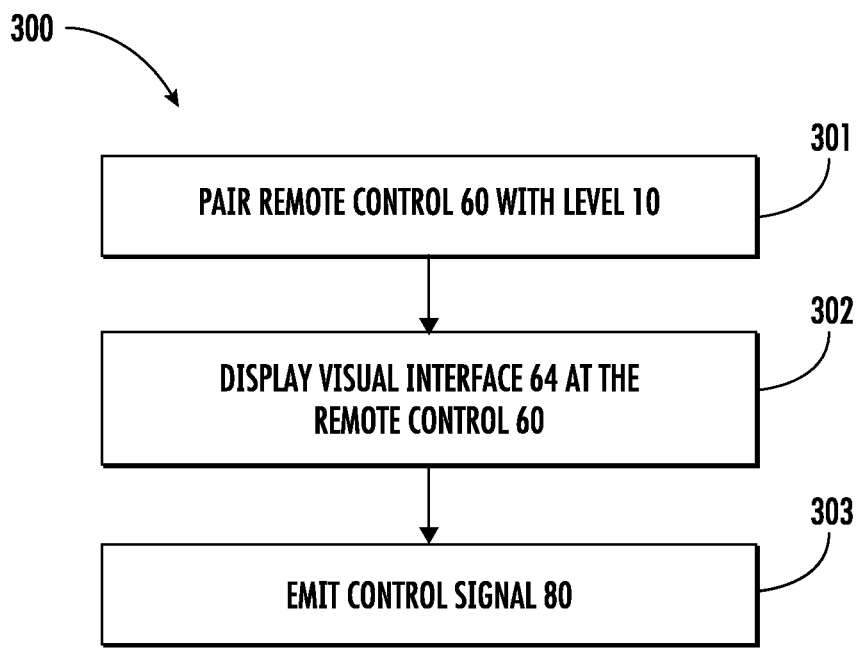
FIG. 9 is a method of using a laser level and a remote control, according to an exemplary embodiment.
Figure 10:
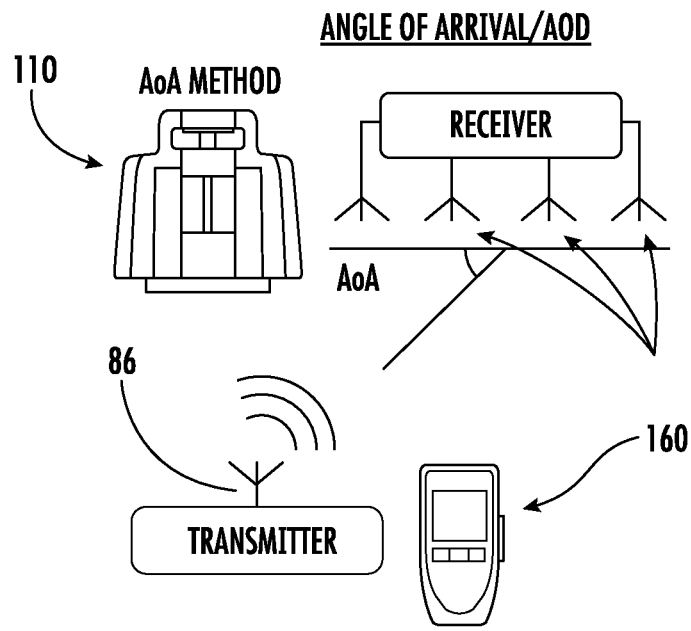
FIG. 10 is a schematic of a laser level and a remote control communicating, according to an exemplary embodiment.
Figure 11:
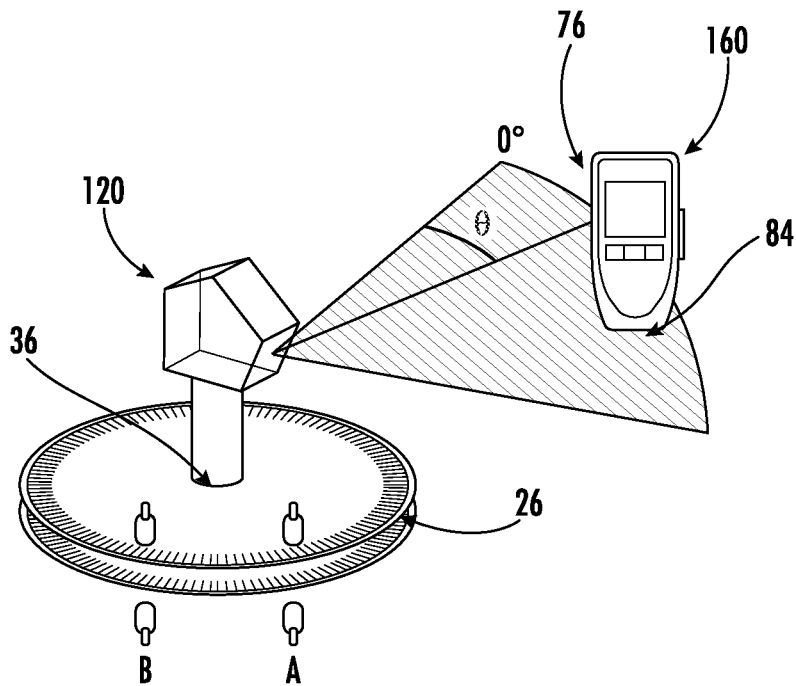
FIG. 11 is a schematic of a remote control receiving a signal from a laser level, according to an exemplary embodiment.

Turning to FIGS. 9-11, various aspects of using a remote control to adjust the orientation of arc 26 of laser 16 emitted by a laser level are shown (method 300). Laser level 110 is similar to laser level 10 except for the differences discussed herein, and remote control 160 is similar to remote control 60 except for the differences discussed herein.

Starting at step 301, remote control 60 is paired with laser level 10 (e.g., an interface protocol is selected by the remote control). Subsequently, graphical user interface 64 is generated and displayed at remote control 60 (step 302). To enable displaying graphical user interface 64, remote control 60 and laser level 10 determine the relative position 36 of laser level 110 and the relative position 84 of remote control 160 (e.g., via determining a relative position of a remote control with respect to a laser level). In a specific embodiment, graphical user interface 64 is generated at least in part based on positions 36, 84 of laser level 110 and remote control 160, respectively, with respect to each other. In various embodiments, the visual interface includes a visual representation of the beam of light emitted by the laser level, and a plurality of operable instructions selectable to adjust an orientation of the beam of light with respect to the housing.

Subsequently, the remote control emits a signal indicating that a first instruction of the plurality of operable instructions was selected (step 303). As a result of receiving the signal, the laser level is controlled to adjust the orientation of the beam of light with respect to the housing.

In a specific embodiment (FIG. 10), relative positions 36, 84 of laser level 110 and remote control 160 are determined via a laser level 110 including a plurality of signal receiving devices, shown as electronic signal receivers 56, and remote control 160 including a plurality of signal emitting devices, shown as transmitter 86. Each of the receivers 56 of laser level 110 receives a signal transmitted by transmitter 86 at a different time. The differences in when the same signal is received by the receivers 56 is used by laser level 110 to calculate relative positions 36, 84 of laser level 110 and remote control 160, respectively. To state this another way, the step of determining the relative position includes utilizing a plurality of receivers to receive a plurality of positional signals, and calculating the relative position based at least in part on a timing when two or more of the plurality of positional signals were received. In various embodiments, the remote control includes multiple receivers and/or transmitters and the laser level includes a corresponding transmitter and/or receiver. In an alternate embodiment, remote control includes a plurality of receivers and the laser level includes at least one transmitter that interfaces with the plurality of receivers to determine relative positions of the laser level and the remote control with respect to each other.

In another specific embodiment (FIG. 11), various aspects of determining relative locations of a remote control to a laser level are shown. Laser level 120 is similar to laser level 10 and laser level 110 except for the differences discussed herein. Laser level 120 emits a light that is received by light-receiving diode 76 coupled to remote control 160. Based at least in part on light received by light-receiving diode 76 (e.g., the angle of the light relative to light-receiving diode 76), the relative positions 36, 84 of laser level 110 and remote control 160 are determined.

Figure 12:
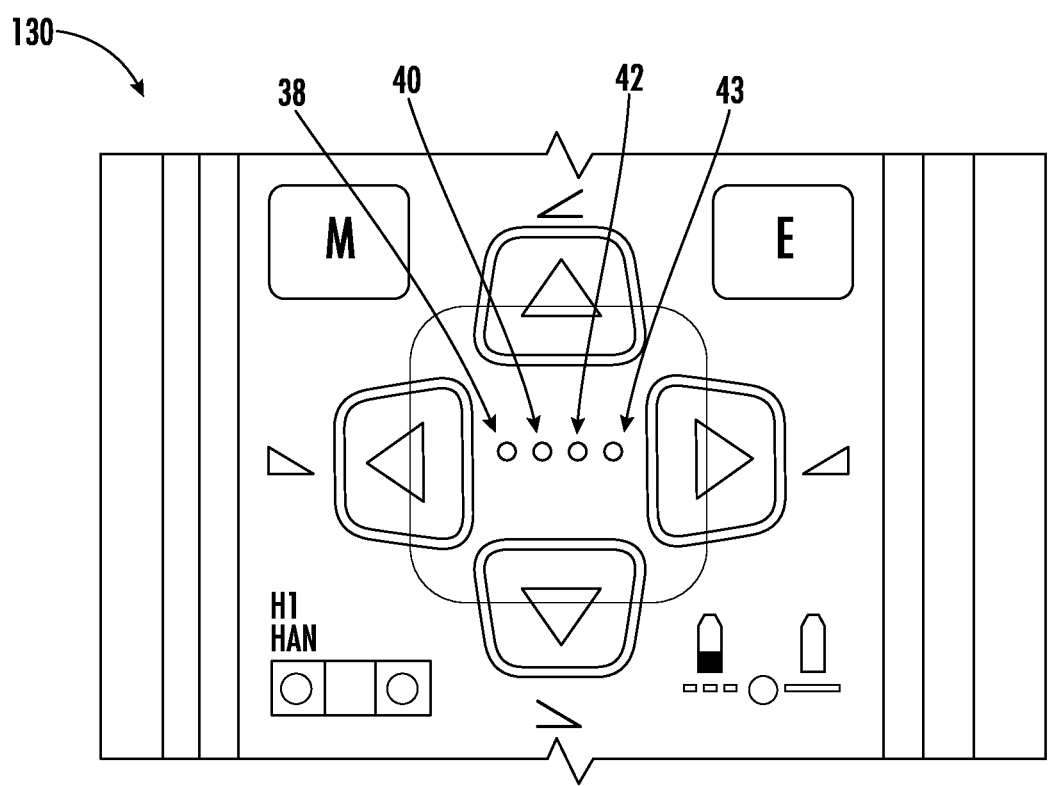
FIG. 12 is a user interface of a laser level, according to an exemplary embodiment.

Turning to FIG. 12, various aspects of displaying an orientation of light emitted by laser level 130 are shown. Laser level 130 is similar to laser level 10, laser level 110 and laser level 120 except for the differences discussed herein. Laser level 130 includes one or more light-emitted devices, shown as LEDs 38, 40, 42 and 43 that indicate respective distinct non-zero slopes of the beam of light emitted by laser level 130. In a specific embodiment, LEDs 38, 40, 42 and 43 indicate a slope of light emitted by laser level 130. For example, first LED 38 indicates whether light emitted by laser level 130 has a slope of 1% or more, second LED 40 indicates whether light emitted by laser level 130 has a slope of 2% or more, third LED 42 indicates whether light emitted by laser level 130 has a slope of 5% or more, and fourth LED 43 indicates whether light emitted by laser level 130 has a slope of 10%. In contrast to a full graphical display, laser level 130 provides angle information via a simple display including a plurality of LEDs associated with a preselected range of angles.

As another example, first LED 38 indicates whether light emitted by laser level 130 has a slope of 1% (e.g., exactly 1%, or within a predetermined range of 1%), second LED 40 indicates whether light emitted by laser level 130 has a slope of 2%, third LED 42 indicates whether light emitted by laser level 130 has a slope of 5%, and fourth LED 43 indicates whether light emitted by laser level 130 has a slope of 10%.

As another example, a remote control that controls the laser level includes one or more LED lights that are associated with distinct non-zero slopes of the beam of light emitted by the laser level. When the laser level is at the specific non-zero slope, the corresponding LED light on the remote control is illuminated.

Figure 13:
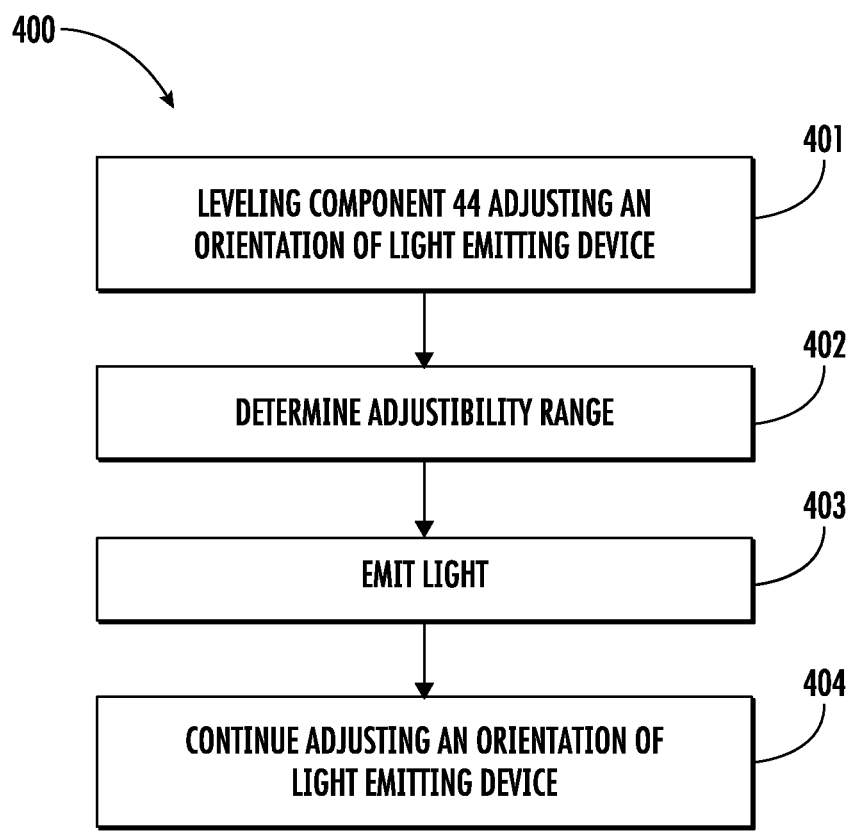
FIG. 13 is a method of using a laser level and a remote control, according to an exemplary embodiment.

Turning to FIG. 13, various aspects of an exemplary method 400 of using a laser level are shown. An orientation adjusting device, shown as leveling component 44, begins adjusting an orientation of a beam of light emitted by the laser level (step 401). Leveling component 44 is configured to adjust an orientation of the beam of light to a predetermined orientation (e.g., horizontal to the ground).

Next, leveling component 44 determines a range that leveling component 44 can adjust the orientation of the beam of light, such as whether leveling component 44 can adjust the orientation to a target orientation (step 402). As a result of determining that leveling component 44 can adjust the orientation of the beam of light to a target orientation (e.g., horizontal), laser level 10 emits the beam of light (step 403), such as from the laser light generator 14. Subsequent to laser level emitting the beam of light at step 403, leveling component 44 continues to adjust the orientation of the beam of light (step 404). In a specific embodiment, the target orientation is a range of orientations (e.g., within plus or minus 1% of perfectly horizontal).

Applicant has observed that users wait until the laser level starts emitting light to walk away from the laser level. Because some laser levels do not start emitting light until they are level, and because the leveling process takes time (e.g., 10-30 seconds), the user waiting until light is emitted can delay work unnecessarily for that amount of time.

Applicant has therefore developed this method of emitting light as soon as the laser level determines that the laser level can be adjusted to the targeted orientation (e.g., horizontal). In various embodiments, the laser level first determines the laser level can be adjusted to the target orientation (e.g., horizontal). In various embodiments this can take approximately one-third of the time to actually level (e.g., 4-8 seconds to make the determination as compared to 10-30 seconds to actually level). Once the laser level determines the target orientation is achievable, the laser level effectively signals the user, by emitting the beam and/or plane of light, that the user can relocate to the various locations where the light is being projected. Further, if the laser level determines that the target orientation is not achievable, the laser level can alert the user much sooner (e.g., within 4-8 seconds as compared to waiting 10-30 seconds before attempting to auto-level and failing).

Figure 14:
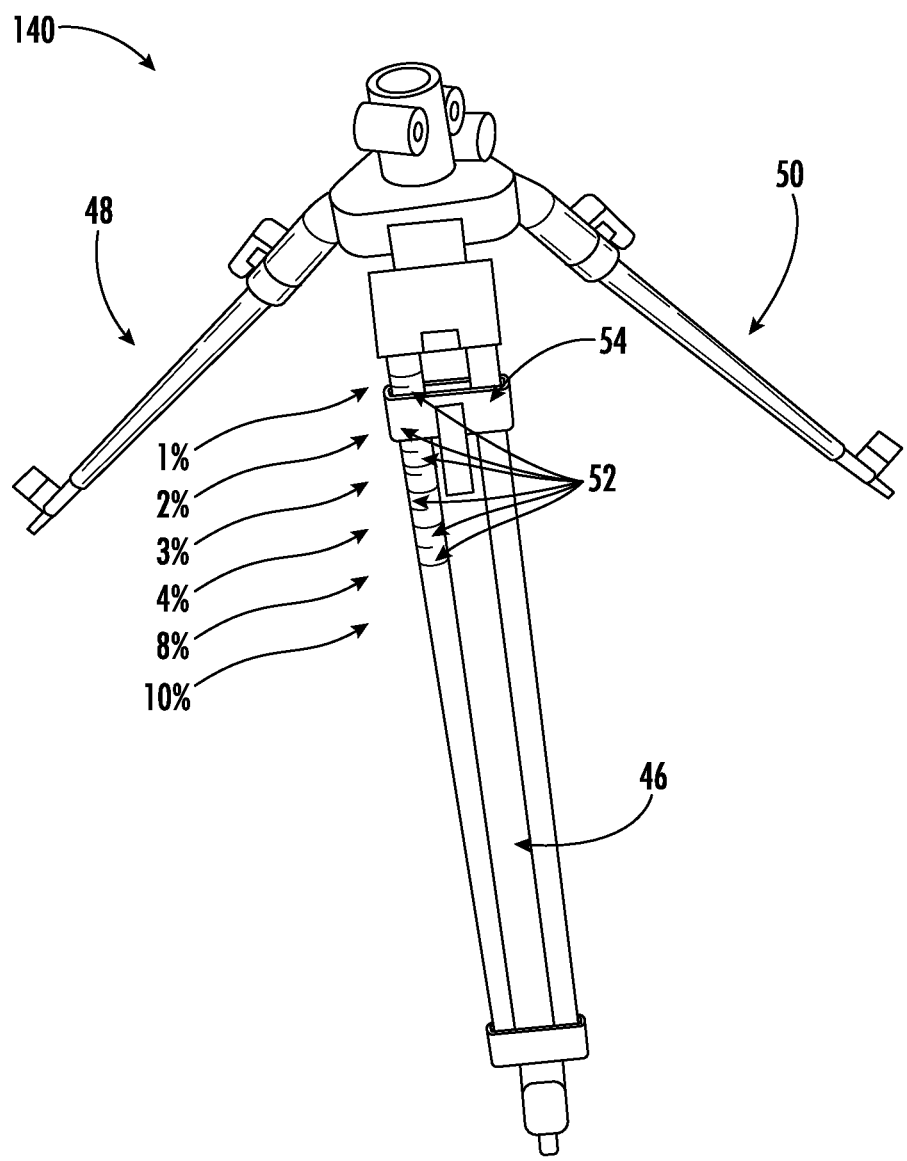
FIG. 14 is a perspective view of a laser level coupled to support legs, according to an embodiment.

Turning to FIG. 14, various aspects of laser level 140 are shown. Laser level 140 is similar to laser level 10, laser level 110, laser level 120 and laser level 130 except for the differences discussed herein. Laser level 140 includes a plurality of support legs, shown as first support leg 46, second support leg 48 and third support leg 50. First support leg 46 includes adjustment mechanism 54 and a plurality of gradations 52 arranged along the length of first support leg 46. Adjustment mechanism 54 is configured to adjust a total length of first support leg 46 and thereby adjust an orientation of the housing of laser level 140. Each of the plurality of gradations 52 corresponding to a distinct resultant orientation of the housing of laser level 140 when selected by the adjustment mechanism 54.

In use, before adjusting the first support leg 46 the user first turns off auto-leveling of the laser level 140. Subsequently, the user aligns the tripod in the desired direction, such as by using sights on the tripod to align the first support leg 46 in the intended direction of the gradation. Then the user adjusts the first support leg 46 to tilt the light emitted from the laser.

In various embodiments the leg includes a plurality of detents, such as recesses in the leg. Each of the detents corresponds to one of the gradations. For example, a first detent corresponds to a 1% gradation, a second detent corresponds to a 2% gradation, and additional detents correspond to a 3% gradation, a 4% gradation, a 5% gradation, a 8% gradation, and/or a 10% gradation. The leg also includes a corresponding protrusion configured to engage with the detents. In use, the user adjusts the leg until the protrusion is interfacing within the targeted detent at the desired gradation. In this way, the user can easily adjust the leg to the desired gradation.

In another embodiment, two or more legs of the laser level include gradations, and optionally also detents. For example, all three legs of the tripod may include gradations, and optionally also detents.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A method of controlling a laser level, the method comprising:
   receiving a plurality of interface protocols at a remote control, each of the plurality of interface protocols configured to enable the remote control to interact with one or more of a plurality of laser levels, wherein each of the plurality of laser levels comprises a laser light generator operable to emit a beam of light at a predetermined orientation with respect to gravity;
   selecting a first interface protocol of the plurality of interface protocols;
   the remote control utilizing the first interface protocol to wirelessly control a first laser level of the plurality of laser levels;
   the remote control utilizing the first interface protocol to wirelessly control a second laser level of the plurality of laser levels;
   installing an update for a software on the second laser level; and
   subsequent to installing the update for the software on the second laser level, the remote control continuing to utilize the first interface protocol to control the second laser level.

2. The method of claim 1, wherein the software on the second laser level comprises firmware installed on the second laser level, and wherein the step of installing the update replaces the firmware from a first version to a second version different than the first version.

3. The method of claim 2, wherein the first laser level is a first model of laser levels and the second laser level is the first model of laser levels.

4. The method of claim 3, wherein the first laser level is configured with the first version of the firmware, and wherein the remote control is configured to control the first laser level configured with the first version of the firmware and to control the second laser level configured with the second version of the firmware.

5. The method of claim 1, further comprising generating a visual interface at the remote control based at least in part on the first interface protocol, wherein the visual interface comprises:
   one or more operable instructions selectable to operate the first laser level; and
   one or more non-operable instructions configured to operate a second laser level but not configured to operate the first laser level.

6. The method of claim 5, wherein the one or more non-operable instructions are not selectable while the remote control is controlling the first laser level.

7. The method of claim 1, wherein the first laser level is a first model of laser levels and the second laser level is a second model of laser levels different than the first model.

8. The method of claim 1, wherein the first laser level is a first model of laser levels and the second laser level is the first model.

9. A method of controlling a laser beam generating device, the method comprising:
   determining a relative position of a remote control with respect to a first laser level, the first laser level comprising a housing and a laser light generator disposed within the housing, the laser light generator operable to emit a beam of light at a predetermined orientation with respect to gravity;
   generating a visual interface at a remote control, the visual interface based at least in part on the relative position of the remote control with respect to the first laser level, the visual interface comprising:
      a visual representation of the beam of light emitted by the first laser level; and
      a plurality of operable instructions selectable to adjust an orientation of the beam of light with respect to the housing;
   emitting a signal, by the remote control, indicating that a first instruction of the plurality of operable instructions was selected;
   as a result of receiving the signal, controlling the first laser level to adjust the orientation of the beam of light with respect to the housing;
   receiving a plurality of interface protocols at a remote control, each of the plurality of interface protocols configured to enable the remote control to interact with one or more of a plurality of laser levels including the first laser level, wherein each of the plurality of laser levels comprises a laser light generator operable to emit a beam of light at a predetermined orientation with respect to gravity;
   selecting a first interface protocol of the plurality of interface protocols;
   the remote control utilizing the first interface protocol to wirelessly control a second laser level of the plurality of laser levels;
   the remote control utilizing the first interface protocol to wirelessly control a third laser level of the plurality of laser levels;

installing an update for a software on the third laser level; and subsequent to installing the update for the software on the third laser level, the remote control continuing to utilize the first interface protocol to control the third laser level.

10. The method of claim 9, the visual interface being generated at the remote control comprising a first image representative of the first laser level.

11. The method of claim 10, the visual interface being generated at the remote control comprising a second image representative of the remote control.

12. The method of claim 9, wherein the step of determining a relative position comprises identifying a quadrant relative to the first laser level in which the remote control is located, wherein the quadrant extends approximately 90 degrees circumferentially around the first laser level.

13. The method of claim 9, wherein the step of controlling the first laser level to adjust the orientation of the beam of light comprises tilting the beam of light to a percent gradation with respect to horizontal.

14. The method of claim 9, wherein the step of controlling the first laser level to adjust the orientation of the beam of light comprises tilting the beam of light to an angle with respect to horizontal.

15. The method of claim 9, wherein the step of determining the relative position comprises:
utilizing a plurality of receivers to receive a plurality of positional signals; and
calculating the relative position based at least in part on a timing when two or more of the plurality of positional signals were received.

16. A method of controlling a laser beam generating device, the method comprising:
generating a visual interface at a remote control to control a first laser level, the first laser level comprising a housing and a laser light generator disposed within the housing, the laser light generator operable to emit a beam of light, wherein the visual interface comprises:
a visual representation of the beam of light emitted by the first laser level; and
a plurality of operable instructions selectable to adjust an orientation of the beam of light with respect to the housing;
emitting, by the remote control, a signal indicating that a first instruction of the plurality of operable instructions was selected;
determining a relative position of the remote control and the first laser level with respect to each other;
as a result of receiving the signal, the first laser level adjusting the orientation of the beam of light with respect to the housing at least in part based on the determined relative position;
receiving a plurality of interface protocols at a remote control, each of the plurality of interface protocols configured to enable the remote control to interact with one or more of a plurality of laser levels including the first laser level, wherein each of the plurality of laser levels comprises a laser light generator operable to emit a beam of light at a predetermined orientation with respect to gravity;
selecting a first interface protocol of the plurality of interface protocols;
the remote control utilizing the first interface protocol to wirelessly control a second laser level of the plurality of laser levels;
the remote control utilizing the first interface protocol to wirelessly control a third laser level of the plurality of laser levels;
installing an update for a software on the third laser level; and
subsequent to installing the update for the software on the third laser level, the remote control continuing to utilize the first interface protocol to control the third laser level.

17. The method of claim 16, wherein the step of determining the relative position is initiated in response to the first laser level receiving the signal.

18. The method of claim 16, wherein the step of controlling the first laser level to adjust the orientation of the beam of light comprises tilting the beam of light to a non-zero angle with respect to horizontal.

19. The method of claim 16, wherein the step of determining the relative position comprises:
utilizing a plurality of receivers to receive a plurality of positional signals; and
calculating the relative position based at least in part on a timing when two or more of the plurality of positional signals were received.

20. The method of claim 16, wherein the remote control comprises the plurality of receivers.

* * * * *